No. 809,015. PATENTED JAN. 2, 1906.
S. SCHISGALL.
CHAIN.
APPLICATION FILED MAR. 31, 1905.
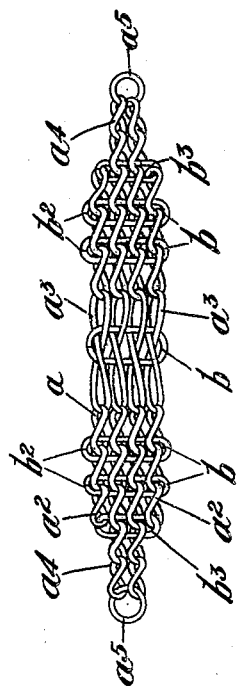
WITNESSES
A. Rader.
J. C. Larsen
INVENTOR
Solomon Schisgall
BY
Edgar Tate & Co
ATTORNEYS

UNITED STATES PATENT OFFICE.

SOLOMON SCHISGALL, OF NEW YORK, N. Y.

CHAIN.

No. 809,015.  Specification of Letters Patent.  Patented Jan. 2, 1906.

Application filed March 31, 1905. Serial No. 253,039.

*To all whom it may concern:*

Be it known that I, SOLOMON SCHISGALL, a citizen of the United States, residing at New York, in the county of New York and State of New York, have invented certain new and useful Improvements in Chains, of which the following is a specification, such as will enable those skilled in the art to which it appertains to make and use the same.

This invention relates to chains designed for use as fob-chains, chatelaine-chains, belts, and the like; and the object thereof is to provide an improved ornamental chain of this class which may be used for any of the purposes specified, as well as for various other purposes, and the construction of which may also be employed in the production or formation of mats and similar devices; and with this and other objects in view the invention consists in a device of the class specified constructed as hereinafter described and claimed.

The invention is fully disclosed in the following specification, of which the accompanying drawing forms a part, said drawing consisting of a single plan view showing my invention applied in the construction of an ordinary fob-chain.

In the practice of my invention I take a plurality of chains $a$ of the form known as "curb-chains," the links of which are twisted so that the ends thereof are at an angle to each other, and a plurality of these chains are placed side by side, as shown in the drawing, and the separate links thereof are connected by transverse links $b$.

In connecting the links of the separate chains $a$ by the transverse links $b$ the wires from which the links $b$ are made are passed through one transverse row of the links of the chains $a$ and then bent over and passed through another transverse row of said links, as clearly shown in the drawing, and the ends of said wire are connected, as shown at $b^2$, so as to form the complete links $b$, and the connection of the ends of said wire at $b^2$ to form the links $b$ may be made in any desired manner, and this connection may be made midway of one side of said links, if desired, by folding both ends instead of one.

In the form of construction shown the chains $a$ are composed of two different styles of links $a^2$ and $a^3$, the links $a^3$ being longer than the links $a^2$, and in the form of construction shown the links $a^3$ are the middle of the chains $a$; but the arrangement may be reversed, if desired, and the longer links $a^3$ may be employed at the ends of said chains $a$ or long and short links may be alternated, if desired, and the shorter links $a^2$ may constitute the middle portions of said chains. It will be apparent that fob-chains of this class may be made of any desired length and of any preferred width, the length of the chains $a$ employed and the number of said chains fixing the length of the fob-chain and the width thereof. It will also be apparent that chains may be made in this manner of any desired length and may be used as belts or for any other desired purpose, and a mat or similar device may be made in the same manner.

In the form of construction shown the two central chains $a$ are extended, as shown at $a^4$, beyond the outer chains $a$ and are held against transverse movement by means of links $b^3$, which are slightly shorter than the links $b$ of the main part of the chain, and the ends of the extensions of the central chains are connected with end links or rings $a^5$, which serve as means for attaching a chain to a watch and attaching a pendant to the chain.

Although I have described the chains $a$ as curb-chains consisting of twisted links, it will be apparent that chains made of ordinary straight links may be employed, if desired; but I prefer chains made of twisted links, as herein shown and described. It will be apparent also that my improvement may be applied to the construction of chain devices of various forms and shapes and intended for purposes other than those herein described, and changes in and modifications of the construction described herein may be made without departing from the spirit of my invention or sacrificing its advantages.

Having fully described my invention, what I claim as new, and desire to secure by Letters Patent, is—

1. A chain device, comprising a plurality of parallel chains placed side by side, the links of the separate chains forming transverse series of links, and the adjacent transverse series of links being connected by a single cross-link the side portions of which are passed through the links of the said two adjacent series of transverse links, substantially as shown and described.

2. A chain device, comprising a plurality of parallel chains placed side by side, the links of the separate chains forming transverse series of links, and the adjacent transverse series of links being connected by a single cross-link the side portions of which are passed through the links of the said two adjacent series of transverse links, and the links of the parallel chains being curb-links, substantially as shown and described.

3. A chain device, comprising a plurality of separate parallel curb-chains placed side by side and the links of which are twisted so that the sides thereof cross, the corresponding links of each chain being connected by a single transverse link, the side portions of which are passed therethrough, said chain device being also provided at the ends with transverse links which connect the corresponding links of the separate chains, and short chains connected with the transverse links, a number of the short chains being less than the number of the first-named chains which make up the body of the device, substantially as shown and described.

4. A chain device, comprising a plurality of separate parallel curb-chains placed side by side and the links of which are twisted so that the sides thereof cross, the corresponding links of each chain being connected by a single transverse link, the side portions of which are passed therethrough, said chain device being also provided at the ends with transverse links which connect the corresponding links of the separate chains, and short chains connected with the transverse links, a number of the short chains being less than the number of the first-named chains which make up the body of the device, some of the links of the body of the device being longer than others and being connected by a single transverse link, substantially as shown and described.

In testimony that I claim the foregoing as my invention I have signed my name, in presence of the subscribing witnesses, this 29th day of March, 1905.

SOLOMON SCHISGALL.

Witnesses:
F. A. STEWART,
C. J. KLEIN.